POSITION DETECTING TRANSDUCER

Original Filed Feb. 4, 1959 4 Sheets-Sheet 1

INVENTOR.
Harold D. Morris
BY Fleh & Swain
Attorneys

POSITION DETECTING TRANSDUCER

Original Filed Feb. 4, 1959 4 Sheets-Sheet 2

INVENTOR.
Harold D. Morris
BY Fleh & Swain
Attorneys

POSITION DETECTING TRANSDUCER

Original Filed Feb. 4, 1959 4 Sheets-Sheet 3

INVENTOR.
Harold D. Morris

BY Flehr & Swain

Attorneys

POSITION DETECTING TRANSDUCER

Original Filed Feb. 4, 1959 4 Sheets-Sheet 4

INVENTOR.
Harold D. Morris
BY Flehr Hohbach Test Albritton & Herbert
Attorneys

United States Patent Office

Re. 27,532
Reissued Dec. 12, 1972

27,532

POSITION DETECTING TRANSDUCER

Harold D. Morris, Pleasant Hills, Calif., assignor to Systron-Donner Corporation, Concord, Calif.

Original No. 3,074,279, dated Jan. 22, 1963, Ser. No. 794,487, Feb. 4, 1959. Application for reissue Apr. 24, 1970, Ser. No. 31,578
Int. Cl. G01p *15/08*
U.S. Cl. 73—517 R 20 Claims

Matter enclosed in heavy brackets [ ] appears in the original patent but forms no part of this reissue specification; matter printed in italics indicates the additions made by reissue.

*ABSTRACT OF THE DISCLOSURE*

*Position detecting transducer for measuring acceleration having a conducting planar element and means for mounnting said planar element for angular movement. A magnet is provided and a coil is disposed in the magnetic field of said magnet and is secured to said planar element for angular movement with said conducting planar element. An inductive pickoff element consisting of a pair of coaxial windings is provided with the windings lying in a plane substantially parallel to the plane of the conducting element and on one side of the conducting element. Means is provided for applying excitation to the pickoff element to establish a magnetic field with the conducting element being positioned relatively close to the pickoff element so that the coupling between the windings is disturbed and losses are reflected into the windings by the conducting element. Detector means is connected to said means for supplying excitation to the pickoff element to give an indication of the position of the conducting element relative to the pickoff. Feedback means is coupled to said detector means for applying a current to said coil proportional to the displacement of the conducting planar element. The means for applying excitation to the inductive pickoff element consists of an oscillator which normally oscillates continuously. The oscillator includes a tank circuit and a feedback circuit. One of the windings of the inductive pickoff element is connected into the tank circuit of the oscillator to form a part of the tank circuit and the other of the windings is connected into the feedback circuit of the oscillator. The output of the oscillator is modulated by variations in spacing between the conducting element and the inductive pickoff element. Additional feedback means couples the detector means to the oscillator to change the gain of the oscillator to thereby control the loop gain and the frequency response of the transducer.*

This invention relates to static and dynamic position detecting transducers and more particularly to such transducers commonly referred to as accelerometers of the linear, angular and resonant types.

Heretofore, strain gauge accelerometers have been utilized. However, the use of such accelerometers is often objectionable because they have a low impedance and a low output. Variable reluctance accelerometers have also been used which give a modulated A.-C. output which may be of high level. However, the use of this type is also often objectionable because it suffers from reaction forces on the moving system which affect the output. Both of these types, the strain gauge and variable reluctance, when used in open loops have an output which is directly proportional to the excitation so that the sensitivity of the accelerometer is directly related to the power supply voltage level. This is a very undesirable feature which can only be avoided by utilizing a closed loop. Closing the loop on such accelerometers to provide a satisfactory device has been found to be difficult and expensive. Such accelerometers are unduly complicated and still do not have the desired accuracy. It is apparent, therefore, that there is a need for position detecting transducers which are compact, and simple, and which at the same time have high accuracy with a high level output.

In general, it is an object of the present invention to provide a position detecting transducer which has high accuracy with a high level output and which at the same time is relatively compact and simple.

Another object of the invention is to provide a transducer of the above character which is not affected by the power supply voltage level.

Another object of the invention is to provide a transducer of the above character in which the output voltage is representative of the total forces acting on the system.

Another object of the invention is to provide a transducer of the above character which can be utilized as angular, linear and resonant accelerometers.

Another object of the invention is to provide a transducer of the above character which has a constant axis of sensitivity.

Another object of the invention is to provide a transducer of the above character in which the position of a dynamic or static element is detected.

Another object of the invention is to provide a transducer of the above character in which the element being sensed is in the form of a flat planar conducting member whose position is detected by a pancake type transformer.

Another object of the invention is to provide a transducer of the above character in which the coil is excited by an oscillator and the output of the oscillator is modulated by the position of the element.

Another object of the invention is to provide a transducer of the above character in which the use of a high carrier frequency in the oscillator is made possible by the use of the alpha gain of a transistor.

Another object of the invention is to provide a transducer of the above character in which the tank circuit is in the collector circuit of the transistor.

Another object of the invention is to provide a transducer of the above character in which the output of the amplifier is sufficient to directly drive the restoring mechanism.

Another object of the invention is to provide a transducer of the above character in which the current which flows in the amplifier precisely represents the acceleration acting on the moving system.

Another object of the invention is to provide a transducer of the above character in which the output may be used directly to operate a recorder or to provide a high voltage output level.

Another object of the invention is to provide a transducer of the above character which can be automatically zeroed.

Another object of the invention is to provide a transducer of the above character which can be utilized in both closed loop and open loop accelerometers.

Another object of the invention is to provide a transducer of the above character which can be utilized in accelerometers having either linear or angular degrees of freedom for the purpose of measuring linear and/or angular accelerations.

Another object of the invention is to provide a transducer of the above character which has a relatively low impedance level and which will not be affected by the presence of media in the surrounding area having a high dielectric constant.

Another object of the invention is to provide a transducer of the above character in which the pickoff can be isolated or physically separated from the electronics.

Another object of the invention is to provide a transducer of the above character in which the circulating currents in the tuned circuit for the oscillator are effectively isolated.

Additional objects and features of the invention will appear from the preferred embodiments which are set forth in detail in the accompanying drawings.

Referring to the drawings.

In general, the present invention consists of a transformer with primary and secondary windings in the form of a pancake and in which oscillator means is utilized for supplying energy to the primary winding to establish a magnetic field. The secondary winding is connected to the oscillator and supplies energy for oscillation. A planar conducting element is positioned in the magnetic field in such a manner that it will interrupt the maximum number of the lines of force. It serves to vary the coupling between the secondary and primary windings and the losses which are reflected into the oscillator. Variations in the spacing between the element and the transformer serve to modulate the output of the oscillator. This modulation is detected by a detector and changed into a high level current signal which is utilized for operating an output amplifier. The output of the amplifier can be used for various purposes. It can be used to operate a restoring mechanism so that the transducer can be used as a closed loop accelerometer. Thus, upon deflection of the conducting element by acceleration, an automatic balance between the input force provided by the restoring mechanism and the force of the acceleration is established. The restoring current in the restoring coil of the restoring mechanism is utilized for developing a voltage across a fixed load resistor which is a precise measure of the input acceleration. The output of the amplifier in another embodiment is used for feeding energy back into the oscillator to make possible automatic zeroing with reduction of the output of the position detector resulting from rapid changes of position. A restoring force is applied by other means than through servo feedback, so that displacements of the mechanically resonant system from the average position, are detected.

Figure 1:
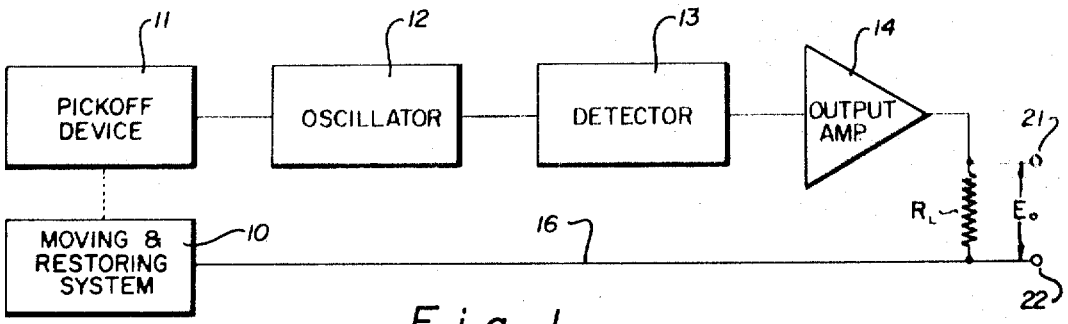
FIGURE 1 is a block diagram of a position detecting transducer incorporating the present invention.

In FIGURE 1, I have shown in block diagram a position detecting transducer which is normally called an accelerometer. As shown in the block diagram, such a transducer consists of a moving and restoring system 10 and a pickoff device 11. The pickoff device is connected to an oscillator 12. The output of the oscillator is fed into a detector 13 which has its output amplified by an output amplifier 14. The output current from the amplifier 14 is fed through a load resistance $R_L$ and through a feedback path 16 to the moving and restoring system 10. An output voltage is generated across the output terminals 21 and 22 and is labelled as $E_0$.

Under action of acceleration, a force is generated on the moving system which tends to develop a displacement. As movement takes place, the oscillator, detector and output amplifier 14 serve as a position error detector and servo amplifier and generate a rapidly increasing feedback signal which is returned as current through the path 16 to the restoring system. With a minute deflection of the moving system, the electro-mechanical servo action of the accelerometer results in automatic balance between the input force proportional to acceleration and the feedback force proportional to current in the restoring coil of the accelerometer. The voltage $E_0$ developed across the fixed load resistance $R_L$ is the electrical output of the instrument and is a precise measure of the input acceleration.

Figure 2:
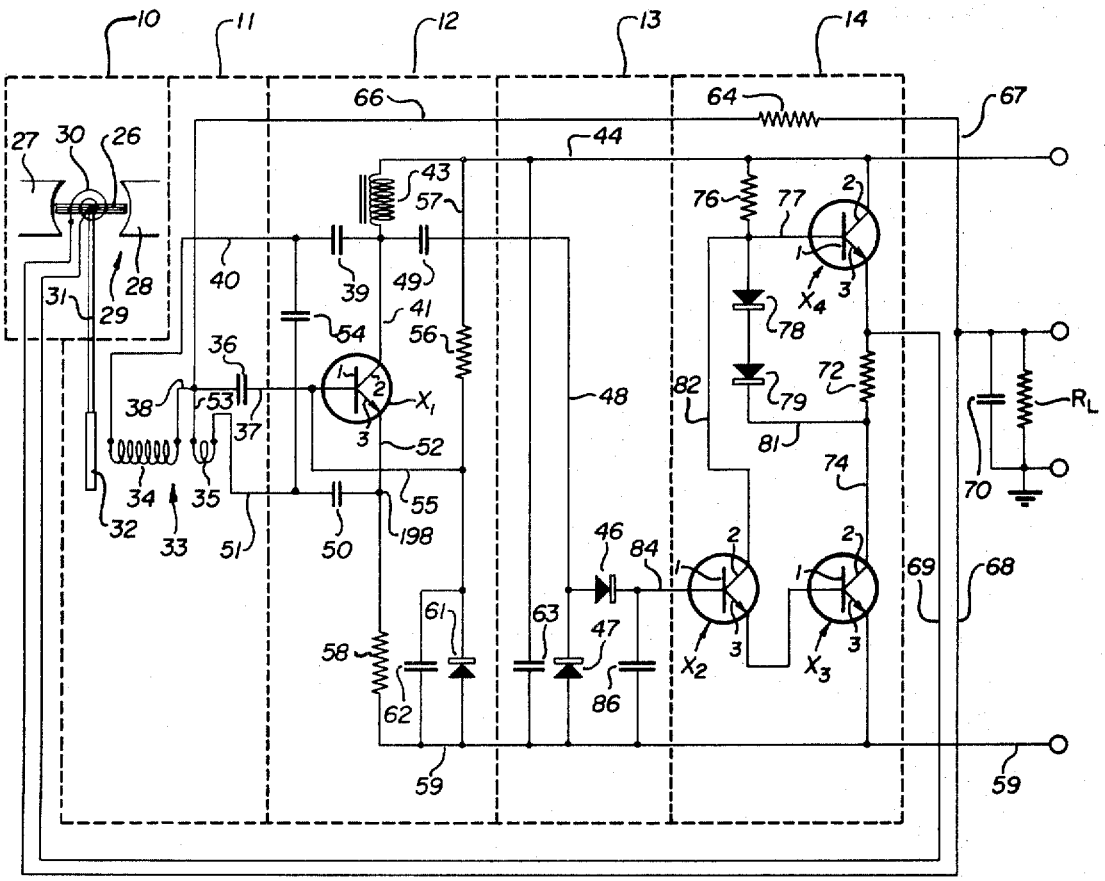
FIGURE 2 is schematic diagram of the position detecting transducer shown in FIGURE 1 being used as an accelerometer, to sense either linear and/or angular accelerations.

In FIGURE 2 is shown a schematic diagram of the accelerometer shown in FIGURE 1. The moving and restoring system 10 and the pickoff device 11 are shown schematically in FIGURE 2 and will be described in detail hereinafter. Briefly, however, the moving and restoring system consists of a moving coil 26 positioned between north and south pole pieces 27 and 28 of a magnet 29. A hairspring 30 is utilized for supplying the current to the moving coil 26 from the feedback path 16. An arm 31 is carried by the moving coil 26 and moves with the coil. The free end of the arm is provided with a conducting element 32 in the form of a flat vane or paddle. The conducting element 32 is placed in such a position that it will interrupt the maximum number of lines of force from the transformer 33. The transformer is constructed in a particular manner as hereinafter described and, in general, consists of a primary winding 34 and a secondary winding 35.

The oscillator 12, the detector 13 and the output amplifier 14, in general, include transistors $X_1$, $X_2$, $X_3$, and $X_4$ each of which is provided with the conventional base, collector and emitter elements numbered 1, 2 and 3. In particular, the oscillator 12 consists of the transistor $X_1$ which has its base 1 connected to one side of a capacitor 36 by a conductor 37. The other side of capacitor 36 is connected to one side of the winding 34 by a conductor 38. The other side of the winding 34 is connected to one side of a capacitor 39 by a conductor 40 and the other side of the capacitor is connected to the collector 2 of the transistor $X_1$ by a conductor 41. The collector 2 of the transistor $X_1$ and the conductor 41 are connected through RF choke 43 and to a suitable source of positive D.-C. such as 15 volts D.-C. by a conductor 44. Conductor 41 is also connected to a pair of diodes 46 and 47 by a conductor 48 through a coupling capacitor 49.

The winding 35 has one side connected to a capacitor 50 by a conductor 51. The other side of the capacitor 50 is connected to the emitter 3 of the transistor $X_1$ by a conductor 52. The other side of the winding 35 is connected to the conductor 38 by conductor 53. A capacitor 54 is connected between conductors 40 and 51.

Conductor 37 is connected by a conductor 55 to one side of a resistor 56, and the other side of the resistor 56 is connected to the conductor 44 by a conductor 57. Conductor 52 is connected through a resistance 58 to a suitable source of negative voltage such as −15 volts D.-C. by a conductor 59. A diode 61 is connected between conductor 59 and conductor 55. An RF bypass capacitor 62 is connected around the diode 61.

An RF bypass capacitor 63 is connected between conductors 44 and 59. A resistant 64 has one end connected to the conductor 38 by a conductor 66 and the other end is connected to one side of the resistance $R_L$ by a conductor 67. The other side of the resistance $R_L$ is connected to ground as shown. Conductor 67 is connected by a conductor 68 to one side of the winding 26. The other side of the winding 26 is connected by a conductor 69 to the emitter 3 of a transistor $X_4$. A capacitor 70 is connected between the conductor 67 and ground. Conductor 69 is also connected to one side of a resistance 72 and the other side of the resistance is connected to the collector 2 of a transistor $X_3$ by a conductor 74. The collector 2 of the transistor $X_4$ is connected to the conductor 44, and the base 1 of the transistor $X_4$ is connected to one side of a resistance 76 by conductor 77. The other side of the resistance 76 is connected to the conductor 44. Conductor 77 is also connected to one side of a diode 78 and the other side of the diode is serially connected to another diode 79. The other end of the diode 79 is connected to the conductor 74 by a conductor 81. The emitter 3 of the transistor $X_3$ is connected to the conductor 59 and the base 1 of the transistor $X_3$ is connected to the emitter 3 of a transistor $X_2$. The collector 2 of the transistor $X_2$ is connected to conductor 77 by conductor 82. The base 1 of the transistor $X_2$ is connected to the other side of the diode 46 by a conductor 84. An RF bypass capacitor 86 is connected between the conductor 84 and the conductor 59. The other side of the diode 47 is connected to the conductor 59.

Operation of the accelerator shown in FIGURE 2 may now be briefly described as follows. In general, the pickup transformer 33 detects the position of the conducting element 32. The transformer 33 is excited by the oscillator. The oscillator output is modulated by the variation in spacing between the conducting plane 32 and the transformer 33. This is detected and changed into a high level current signal which operates the transistors in the output amplifier. The output amplifier brings the power level up to where the restoring mechanism will automatically be regulated by the closed servo-loop so that the current which flows therein actually represents the acceleration acting on the conducting element 32. Therefore, the output current will be a function not of any resistance in the output circuit, but only of the acceleration which the system is undergoing. This output current may be used directly to operate a recorder or the voltage across the resistance $R_L$ may be utilized. The presence of the resistance $R_L$ does not affect the actual output current of the servo but it will affect the total loop gain. This is true because one of the transfer constants in the loop of the accelerometer is the output circuit where the output voltage from the amplifier is changed into an output current by the total resistance in the output circuit.

The oscillator 12 utilizes the alpha gain of the transistor $X_1$ rather than the beta gain because it employs a grounded base circuit. This makes possible the use of a higher carrier frequency. The winding 34, winding 35, and the capacitor 54 form the tank circuit for the oscillator and the capacitor 54 is tuned for the desired frequency. However, since the exact frequency of the oscillator is not important, a fixed capacitor is utilized rather than a variable capacitor. The fixed capacitor is chosen so that the oscillator will operate at a suitable frequency such as, for example, 1½ megacycles. The choice of the frequency is made so that the components are of optimum size and within the bandwidth of the transistor. As is well known to those skilled in the art, the higher the frequency, the smaller the components. Since small components are generally desirable in devices of this type, higher frequencies are normally utilized. However, the higher the frequency, the higher the bandwidth required of the transistor. The bandwidth desired should be below the alpha cutoff to prevent a serious drop in current efficiency.

Any suitable transistor may be utilized in the oscillator. A transistor identified by type No. 2N332/2N117 operates very satisfactory because it has been found that transistors having low beta, that is, low gain, operate more satisfactorily than those with high beta because the alpha cutoff or frequency response has been found to vary inversely with the beta of the transistor, that is, the higher the gain of the transistor, the lower the frequency response.

The tank circuit for the oscillator is shunt fed and for that reason there is no D.-C. potential between the pickoff transformer 33 and ground due to the oscillator positive supply voltage.

The RF choke 43 serves to isolate the plate supply or the positive D.-C. voltage appearing on line 44 from the collector circuit of the oscillator. The capacitor 39 couples the collector circuit to the coil 34 without allowing any appreciable D.-C. voltage to appear at the pickoff transformer.

The voltage applied to the emitter-base circuit of the transistor $X_1$ is stabilized by the diode 61. The diode 61 is of a particular type known as a Zener diode and identified by type No. ZA–15. As is well known to those skilled in the art, the Zener diode has a specific breakdown voltage in the reverse direction. Thus, in the present circuit, it breaks down from the voltage applied from the conductor 44 and maintains a constant voltage thereafter independent of the supply voltage supplying the base-emitter circuit of the transistor $X_1$. Since the actual voltage appearing between the base and the emitter is relatively small (e.g., approximately ½ volt), and because very little current is required by the base when the emitter current is flowing, most of the voltage from the conductor 44 appears across the isolating resistance 5 which thereby establishes a constant biasing current flowing into the emitter of the transistor $X_1$. Substantially this same current flows in the collector circuit of the transistor because very little is contributed by the base of the transistor. Stabilization of the collector current of $X_1$ as described makes the output of the oscillator substantially independent of supply voltages.

The pickoff transformer 33 is capacitively coupled to the oscillator circuit by the capacitors 36, 39 and 50. Capacitor 54 is mounted close to the pickoff transformer when separation of the pickoff and electronics is necessary, so that RF circulating currents do not flow through the capacitors, 36, 39, and 50, thereby minimizing the voltage drop in the capacitors as well as the magnetic fields surrounding the conductors. The position of capacitor 54 effectively isolates the circulating current of the tuned circuit so that voltage drops and couplings will not interact to provide spurious modes of oscillation. The resistor 64 connecting one output terminal to the pickoff transformer allows the pickoff transformer to carry the average potential of the output. This eliminates the major source of nonlinearity, that due to coulombic forces resulting from potential difference between the pickoff and the moving system.

A pickoff of this type has a relatively low impedance so that it is not markedly affected by the presence of a medium having a high dielectric constant. This is important when it is desirable to separate the pickoff from the electronics or when the pickoff is used in oil filled instruments.

The voltage appearing across the winding 35 is essen-
ially applied from the base to emitter on the transistor
$X_1$ so that the RF voltage appearing on winding 35 mod-
lates the D.C. emitter current. Therefore, RF currents
n the winding 35 will flow directly in the emitter cir-
uit and will be carried straight through to the collector
n the same magnitude with only a small loss due to the
ase being intermediate. Therefore, modulation of the
mitter current by the winding 35 also causes modula-
ion of the collector current. This collector current is
oupled through the capacitor 39 into the transformer
3.

The oscillator itself works in a manner which is similar
o the Armstrong tickler oscillator. Instead of a part
f the output voltage being fed back, a part of the out-
ut current is fed back to the input. The winding 35
s wound so that it changes the amplitude and phase
f the current to feed it back into the input in the proper
hase.

The transformer 33 provides a majority of the current
ain in the total circuit. Assuming that there is no
eakage in the transformer, the transformer 33 should
ive a gain which is directly proportional to the ratio
f turns of the winding 34 to the turns of winding 35.
Thus, the ratio of the current in the collector circuit with
espect to the current flowing in the emitter circuit will
e determined by this ratio. The transistor $X_1$ is, there-
ore, not being used as a current gain device but actually
s a voltage gain device to drive the high impedance
ank circuit connected to the collector.

This oscillator circuit has a distinct advantage in that
t has a substantially constant gain regardless of tem-
erature changes. As is well known to those skilled in
he art, in the normal transistor, if only the current gain
f the transistor were used, the gain would drop off sharp-
y with a drop in temperature. On the other hand, the
oltage gain of the transistor increases with a drop in
emperature. In this oscillator circuit, these two char-
cteristics are combined because the impedance of the
vinding 35 operates into the very low impedance of the
mitter circuit.

As is well known to those skilled in the art, when an
xtremely low impedance winding is used for the emitter
rive, the voltage gain of the transistor is being used
o achieve oscillation whereas when a very high impedance
vinding is used for the emitter drive, the current gain of
he transistor is being used to achieve oscillation. I have
letermined that with an intermediate impedance, the char-
cteristic of the pickup remains unchanged through wide
emperature ranges (−55° C. to +125° C.) without
equiring compensation. This is due to the fact that
vhen the temperature rises, the current gain increases
nd the voltage gain decreases, and when the temperature
lrops, the current gain decreases and the voltage gain
ncreases.

As explained previously, the diode 61 serves to main-
ain the operating point of the transistor $X_1$ as the tem-
erature changes because there is little change in the in-
ernal voltage of the transistor (approximately ½ volt)
o that the total operating current of the transistor re-
nains essentially constant with temperature.

Thus, to obtain a device which will operate satisfac-
orily in wide ranges of temperaure, it is only necessary
o choose a proper impedance for the pickup winding
35. For example, with the transistor type No. 2N332/
2N117, it was found that an impedance of 20 ohms gave
very satisfactory results.

The capacitor 49 couples the collector circuit of the
oscillator over to the full wave detector 13. The full
wave detector consists of the diodes 46 and 47 which
are connected in opposite directions. The full wave de-
ector acts in a manner similar to a conventional voltage
loubler circuit in that the capacitor 49 charges through
the diode 47 for negative going parts of the sine wave and discharges through diode 46 for the positive going parts so that a current of essentially double amplitude is being sent through the diode 46 and into the preamplifier transistor $X_2$ which is part of the output amplifier 14. The capacitor 86 acts as an R.F. bypass to minimize the pulsing of the current flowing into the preamplifier transistor $X_2$. Capacitor 63 is an R.F. bypass capacitor and serves to prevent external radio frequencies from affecting the internal circuitry and prevents leakage from the internal oscillator out through the power supply.

The detector current which is supplied by the detector 13 is multiplied by the beta of the transistor $X_2$ and is fed into the base of the transistor $X_3$, which through the diode-resistor network 72, 78 and 79 controls the transistor $X_4$. The voltage appearing across the resistor 72 provides a voltage for operating the diodes 78 and 79.

Transistor $X_4$ has a bias current flowing from the B+ line 44 through the resistance 76 to its base. When this bias current is allowed to flow, the transistor $X_4$ is pulled on vigorously. An alternate path is provided for the bias current through the diodes 78 and 79 so that the transistor $X_3$ can bypass the control current for the transistor $X_4$ and turn it off.

For negative going signals, transistors $X_2$ and $X_3$ are carrying current and supplying the signal current. Transistor $X_4$ is almost entirely turned off. The current flows from ground through the load resistance $R_L$, the conductor 68, the torque coil 26, the conductor 69, resistance 72, down into the transistor $X_3$.

For large positive going signals, transistors $X_2$ and $X_3$ run at a low current level and transistor $X_4$ is turned on by the unshunted bias current flowing through resistance 76. This pulls the output up to a maximum positive level. The current flows through transistor $X_4$ through conductor 69, the torque coil 26, conductor 68, a resistance $R_L$ to ground. This arrangement makes it possible to have maximum effort when the signal goes positive and negative for moving the torque coil 26.

The capacitor 70 acts as a phase compensation capacitor and is utilized for stabilizing a gas-filled or evacuated accelerometer. In the above accelerometer, the loop is essentially very unstable because it is a second order system with very low inherent damping, that is, there are no losses in the circuit. In order to stabilize the loop, a leading-phase current is provided by the shunt path across the load resistor $R_L$. This leading current acts as velocity damping and is selected to provide optimum damping to the servo.

As an alternate, a fixed resistor can be used to replace the transistor $X_4$. This, however, would not be nearly as efficient as the transistor, and would result in a much lower effective loop gain.

The output amplifier 14 which consists of the combination of the transistors $X_2$ and $X_3$ is basically an emitter follower operating into a grounded emitter stage. The transistor $X_4$ makes possible a very good utilization of the available power supply voltage in that it permits the signal from the double transistor amplifiers $X_2$ and $X_3$ to go almost as far negative as the available negative supply voltage. Because the transistor $X_2$ derives its collector current from the base 1 of transistor $X_4$, the transistor $X_2$ can very effectively assist in turning off transistor $X_4$ and make it possible to very closely approach the negative voltage on line 59.

The network controlling transistor $X_4$ has been arranged so that the voltage across resistor 72 is maintained substantially constant. Thus, except for a variable current flowing through the resistance 76, the transistor $X_3$ operates at a constant current level irrespective of the level of the output voltage. Therefore, to the first approximation, there is very little change in the current required on transistor $X_3$ in order to attain any desired level of output between a certain predetermined range, as for example, ±10 volts.

By way of example, one embodiment of the present invention had the following values for the various components.

| | | Turns |
|---|---|---|
| Winding **34** | | 50 |
| Winding **35** | | 5 |
| Capacitors: | | |
| **36** | mf | .02 |
| **39** | mf | .01 |
| **49** | mmf | 220 |
| **50** | mf | .005 |
| **54** | mmf | 300 |
| **62** | mf | .01 |
| **63** | mf | .01 |
| **70** | mf | [1].15 |
| **86** | mf | .001 |

[1] Value chosen for optimum response.

| | | |
|---|---|---|
| RF Choke **43** | microhenries | 500 |
| Resistors: | | |
| **56** | ohms | 15K |
| **58** | ohms | 10K |
| **64** | megohms | 10 |
| **72** | ohms | 270 |
| **76** | ohms | 15K |
| $R_L$ | ohms | 5000 |

| | |
|---|---|
| Transistors: | |
| $X_1$, $X_2$, $X_3$ and $X_4$ | Type No. 2N117 |
| **46, 47, 78** and **79** | Type No. 1N625 |
| **61** | Type No. ZA–15–2 |

One moving and restoring system 10 and pickoff device 11 found to operate very satisfactorily in the accelerometer shown in the schematic diagram in FIGURE 2 is shown in detail in FIGURES 3, 4, 5 and 6. As shown therein, the transformer 33 is in the form of a flat pancake so that the greatest number of lines are interrupted by the paddle or vane-like conducting member of element 32. The transformer is mounted on a block 91 of suitable insulating material such as Micarta.

In fabricating the small transformer 33, it has been found desirable to provide the block 91 with a cylindrical extension 92 centrally located on the block and extending from the top surface of the block a suitable distance such as .007 of an inch. The transformer 33 consisting of the primary and secondary windings 34 and 35 can then be wound on the extension 92 in any suitable manner. For example, a washer (not shown) can be mounted on the extension 92 by a screw (not shown) and then the wire forming the transformer can be wound into the small groove between the washer and the block 91. The secondary winding 35 can be wound first on the extension 92 and then the primary winding 34 can be wound on the extension. By winding the wires forming the transformer in this manner, it is possible to fabricate the transformer so that it takes the desired pancake form on top of the block 91. During the winding of the wires onto the extension 92, they can be coated with an epoxy material which is allowed to harden before the washer is removed. Thus, when the washer was removed, a perfectly flat face is presented by the top of the pancake type transformer 33.

The transformer 33 can be formed from any suitable material. For example, it was found desirable to fabricate the secondary winding 35 with 5 turns of No. 45 "Formvar" copper wire. The primary winding 35 was formed with 50 turns of similar wire. The ends for the respective windings were brought down into the block 91 and then out of the block for connection to the other circuitry.

The pancake type construction is desirable because a doughnut-shaped field is obtained with a maximum field strength in the internal opening of the pancake. The small secondary winding 35 is transformer coupled by the lines of force to the primary winding 34. The current flowing in the small winding 35 will generate a field which opposes the field of the large primary winding 34. When the conducting plane 32 is brought close to the pancake transformer 33, the conducting plane 32 tends to appear like a lossy shorted turn on the major or primary winding 34.

It is desirable that the vane-like or paddle-like member 32 be a substantially planar member formed of a conducting material such as aluminum. Other materials, including copper, brass and steel, may be used. The conducting plane can be of any suitable thickness such as .008 of an inch of any suitable size. However, in order to achieve maximum efficiency, the conducting plane should have a larger size than the size of the pancake transformer 33 so that edge effects are minimized. For example, in one embodiment of the invention, the transformer 33 had an O.D. of .250 and an I.D. of .187 of an inch, and the conducting plane 32 had a diameter of .350 of an inch.

With such parameters, it was found that the normal operating position for the conducting plane 32 was between approximately .007 to .014 of an inch. This means that the conducting plane is generally between 1 and 2 thicknesses of the transformer away from the transformer 33 and gives an indication of the large effect movement of the conducting plane 32 has on the field of the transformer 33. A substantially linear voltage output of 10 to 20 volts can be obtained for .001 of an inch displacement of the conducting plane. Up to 10 volts has been realized for a movement of .00001 of an inch.

The effects of the conducting plane 32 nearing the transformer 33 energized by the oscillator 12 are twofold. One effect is the reflection of losses into the ocillator, and the other is the shielding effect. The conducing plane reflects losses because it is not a perfect conductor. It acts as a shield because it distorts the shape of the field created by the primary winding and thereby changes the effective coupling between the primary and secondary windings of the transformer. For that reason, the closer the conducting plane 32 comes to the transformer 33, the less the coupling between the primary and secondary windings. The amount of energy that the collector circuit of the oscillator feeds into the emitter circuit is varied by the coupling. The loading in the collector circuit is varied in the same direction by the variations in the reflected losses caused by movement of the conducting plane.

Movement of the conducting plane 32 relative to the transformer 33, therefore, effects a variation in the loss reflected and a variation in the coupling. Since both of these effects are additive, they serve to create a very sensitive device. The construction hereinbefore described permits the interruption of the maximum number of lines of force and that maximum variation in reflected losses and maximum variation in coupling between the windings of the transformer and, therefore, also helps to create a very sensitive device.

The conducting plane 32 is carried by the arm 31 which is mounted on a pivot 97 carried by upper and lower support means 98 and 99. The winding 26 is adapted to rotate between north and south poles 27 and 28 of the permanent magnet 29 which is of conventional construction. The permanent magnet 29 is enclosed within a soft iron shield 102 which is carried by a mounting 103 also of conventional construction.

Figure 7:
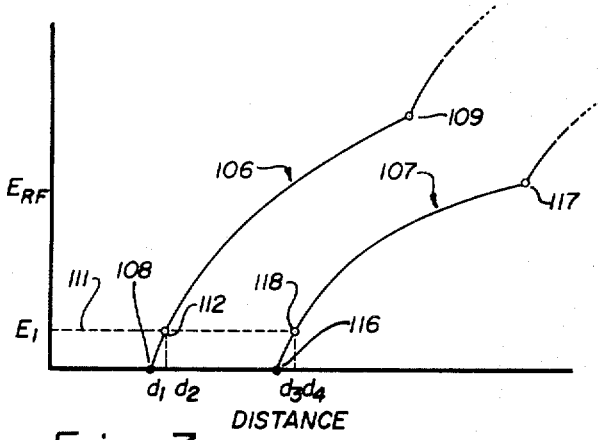
FIGURE 7 is a graph showing curves which represent the output of the oscillator at two different levels.
Figure 8:
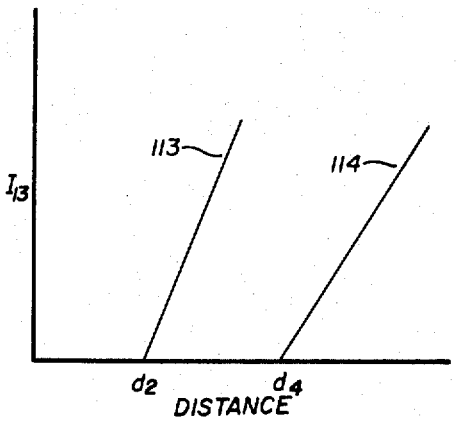
FIGURE 8 is a graph showing curves of the output of the detector at two different levels of output of the oscillator.

In FIGURES 7 and 8 are shown typical performance curves for an accelerometer of the type hereinbefore described. FIGURE 7 shows the output voltage at the collector of the oscillator 12 with the diode detector 13 disconnected. This output voltage is plotted against the spacing of the conducting plane 32 from the pancake transformer 33. Two curves 106 and 107 are shown. Curve 106 represents the output when there is a high level of current flowing in the oscillator whereas curve 107 represents the output when a low level of current is flowing in the oscillator. When there is a high level of current flowing in the oscillator, the conducting plane 32 must be moved in relatively close to the pancake transformer 33 in order to kill the oscillations in the oscillator. Thus, it can be seen that the output voltage remains at zero until there is a certain spacing between the conducting plane and the pancake transformer and only begins at a certain spacing designated as $d_1$ and indicated as point 108 on the curve 106. At this spacing, the oscillator begins oscillating and the output voltage increases very sharply on a relatively steep curve as shown and continues on this steep curve until a point 109 is reached, at which point secondary oscillation occurs to cause a discontinuity in the curve. This discontinuity has no importance in the range of operation of the present device.

The dotted line 111 represents the threshold voltage $E_1$ which indicates the voltage required on the collector of the oscillator 12 before the detector 13 begins to throw a current into the output amplifier 14 and into the load resistance $R_L$. The spacing $d_2$ represents the spacing required between the conducting plane 32 and the transformer 33 before the detector current as shown in FIGURE 8 will begin rising from zero. Point 112 indicates intercept on the curve 106 with the spacing $d_2$. Thus, when the diode detector 13 is connected to the oscillator 12, the output voltage curve 106 rises from the point 108 to the point 112 as indicated. After point 112, the curve bends over until it is almost a flat line with no vertical rising character because the diodes of the detector 13 serve to absorb all of the excess power that is being pulled into the oscillator through the emitter circuit.

The oscillator 12 is not a variable level oscillator but rather a variable output oscillator because the change in RF voltage observed at the collector of the oscillator is very small in comparison to the change in the output of the detector as the conducting plane 32 is moved back and forth with respect to the transformer 33.

For the low level output of the oscillator 12 represented by the curve 107, it can be seen that substantially the same results are obtained, with the exception that the gain of the oscillator is somewhat increased under a high current condition than on a low current condition. This is shown by the difference of the slopes of the two curves 113 and 114 in FIGURE 8. With respect to curve 107, oscillation begins at the spacing $d_3$ represented by the point 116 on curve 107 and also rises steeply as shown until a discontinuity at 117 occurs for the same reason that the discontinuity 109 occurs in curve 106. The point 118 represents the point at which current begins to flow in the detector circuit and is represented by the spacing $d_4$. The detector current is shown in curve 114. Since the curve 114 is less steep than curve 113, it can be seen that the gain of the oscillator is greater under the high current condition than under the low current condition. From the curves 113 and 114, it can be seen that the detector current rises very sharply as soon as the threshold voltage $E_1$ is reached on the collector of the oscillator.

The difference in the slope of the two curves 113 and 114 is important for automatic zeroing of the accelerometer as hereinafter described. From these curves it can be seen that the spacing to obtain a certain value of current in the detector circuit can be changed merely by changing the operating current of the oscillator.

Figure 4:
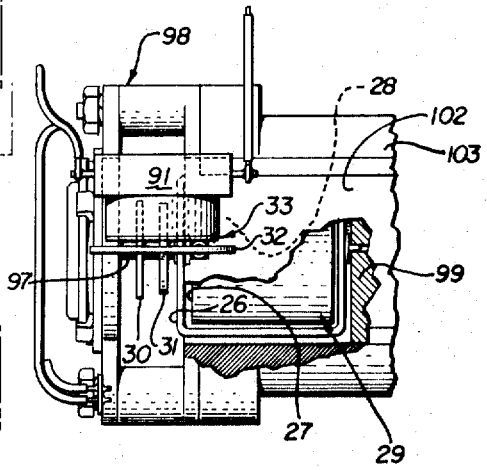
FIGURE 4 is a side elevational view looking along the line 4—4 of FIGURE 3.
Figure 5:
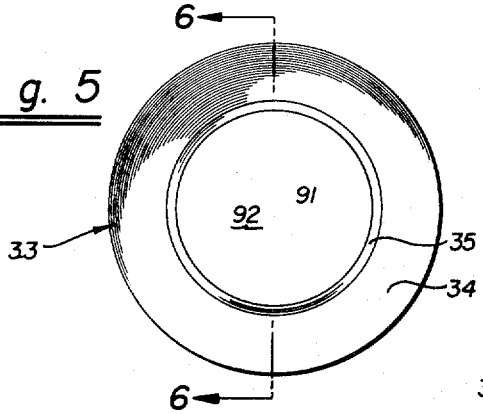
FIGURE 5 is an enlarged top plan view of the pancake type pickoff transformer and its support.
Figure 6:
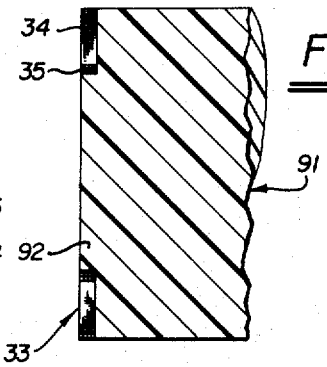
FIGURE 6 is a cross sectional view taken along the line 5—5 of FIGURE 5.
Figure 9:
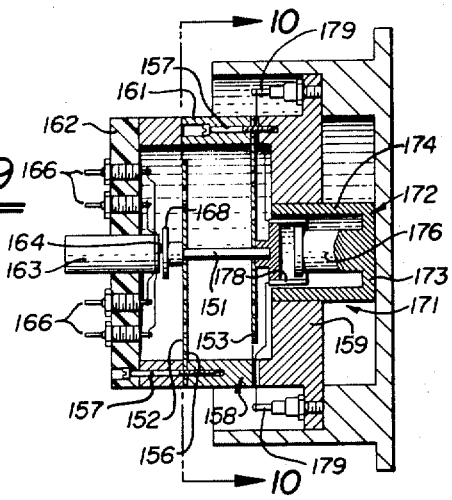
FIGURE 9 is an enlarged cross sectional view of the moving and restoring system and a pickoff device suitable for an accelerometer with a single linear degree of freedom, for sensing linear accelerations.
Figure 10:
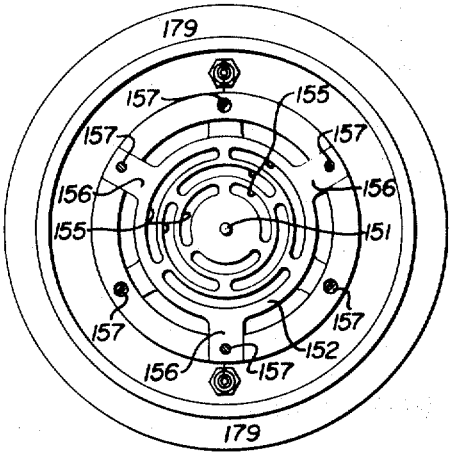
FIGURE 10 is a cross sectional view taken along the line 10—10 of FIGURE 9.
Figure 11:
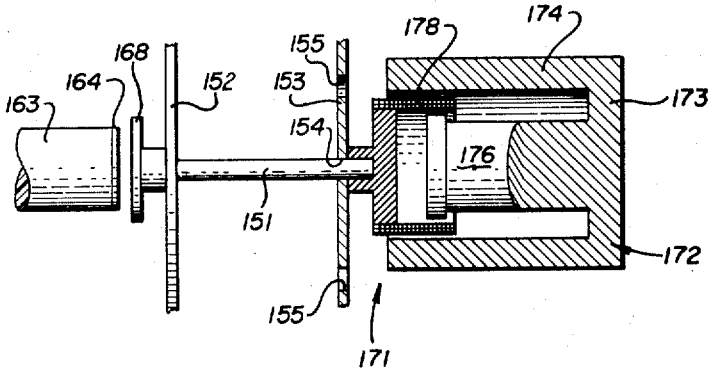
FIGURE 11 is an enlarged view, partly in cross section, of the moving and restoring system and pickoff transformer.

The apparatus shown in FIGURES 4, 5 and 6 is commonly associated with what is called a pendulous or angular-motion accelerometer. In FIGURES 9, 10 and 11, I have shown apparatus which is commonly associated with what is commonly called a linear-motion accelerometer. As shown, this apparatus consists of a cylindrical rod-like member 151 which forms a mass. It is desirable to suspend this mass in such a manner that it has as much freedom as possible for movement along one axis, as for example, the axis of the rod 151, and none along other axes. For that reason, it is desirable to have a spring constant which is as close to zero as possible. However, since the mass must be supported it is not possible to obtain complete freedom of movement along the desired axis.

One method of mounting for the mass 151 consists of a pair of spring members 152 and 153. Each of the spring members is provided with a central opening 154 which accommodates the associated end of the mass 151 and frictionally engages the mass. As shown, the spring member is provided with a plurality of offset arcuate cut-out portions 155 is concentric circles. Three ears 156 spaced 120° apart are provided on each of the spring members and are mounted on screws 157 placed in the housing 158. It has been found that this type of mounting for the mass provides maximum constraint on the axes perpendicular to the desired line of motion for the mass and minimum constraint along the axes or desired line of motion for the mass 151.

The housing 158 consists of a base 159, an intermediate cylindrical section 161 and a cap 162. Certain of the screws 157 are utilized for securing the intermediate section 161 to the base 159 and certain of the screws 157 are utilized for securing the cap 162 to the intermediate section 161 as shown.

The pickoff device is mounted in the cap 162 and consists of a cylindrical insulating member 163 which is centrally disposed in and held by the cap 162. A pancake type transformer 164 similar to the transformer 33 is mounted on the inner end of the insulating member 163. The windings of the transformer are connected to terminals 166 mounted in the cap.

A conducting plane 168 is mounted on the end of the rod 151 and is similar to the conducting plane 32. It is mounted on the rod 151 at right angles to the rod and in a plane parallel to the plane of the transformer 164 so that it also interrupts the maximum number of lines of force from the transformer 164.

Restoring means 171 is mounted in the cap 159 and consists of a magnet 172. The magnet is formed with a base 173 upon which is mounted a barrel 174. A cylindrical member 176 is mounted on the base 173 within the barrel 174. The magnet is polarized in such a manner that the cylindrical member 176 serves as the north pole, and the barrel and base serve as the south pole.

A cylindrical winding 178 is mounted on the end of the rod 151 which is adjacent the base 159 and encompasses the pole 176. The winding 178 is connected to the terminals 179. The terminals 179 are normally connected to the output from the output amplifier 14 in the same way that current is fed to the moving coil or winding 26 in the angular-motion accelerometer.

Figure 3:
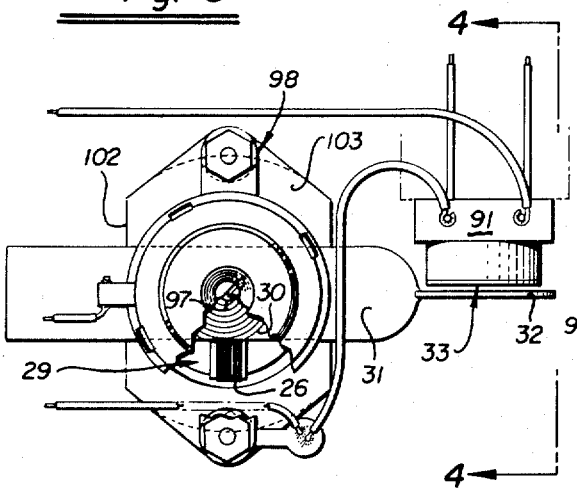
FIGURE 3 is a greatly enlarged plan view of the moving and restoring system and the pickoff device suitable for such an accelerometer.

The principle of operation of apparatus of the type shown in FIGURES 9–11 is similar to that of the apparatus shown in FIGURES 3 and 4, except that it operates with linear motion rather than angular motion. When connected to circuitry such as that shown in FIGURE 2, a small displacement of the plane 168 relative to the transformer 164 causes the generation of a feedback signal to the winding 178 of the restoring system 171. The transformer 164 determines whether the mass 151 is trying to move with respect to the case or housing 158. If the mass is trying to move, current is fed back into the coil 178 and tends to operate on the mass 151 to force it back to its zero position. Therefore, another force balance system is provided which operates on principles similar to that hereinbefore described. As in the angular-motion accelerometer, the electro-mechanical servo action results in automatic balance between the input force proportional to the acceleration and feedback force proportional to the current in the restoring winding 178.

The angular-motion accelerometer lends itself to certain applications, particularly because the meter-type mechanism utilized for the restoring mechanism is very small and has desirable characteristics. However, such a system has an inherent disadvantage in that there is always some friction between the pivots and the supports for the pivots which places an indeterminate factor in the output from the accelerometer due to the spurious torques acting directly on the moving system.

The linear-motion accelerometer avoids this difficulty by eliminating friction. However, such an accelerometer must work against a very heavy spring constant, and for that reason the gain of the system must be boosted substantially to overcome this heavy spring constant. This disadvantage is far outweighed by the fact that a linear motion system has a constant axis of sensitivity, whereas the angular-motion accelerometer relies upon electronics to maintain the axis of sensitivity in some relation with the case of the instrument. The linear-motion accelerometer is not dependent in this way because the line of motion of the mass is determined only by the mechanical springs rather than by the electronics associated with the mechanism.

The accelerometers hereinbefore described are well adapted to telemetering, navigation, control gyro erection, and shorter range inertial guidance applications in aircraft and missiles. The output current from the accelerometer is proportional to acceleration and is of sufficient level to operate magnetic amplifiers, servo valves, and other control components or instrumentation without further amplification. With single or double integration of accelerometer output, velocity and displacement can be measured on an inertial basis. Orthogonal components of acceleration, and magnitude and direction of total vector acceleration may be measured by using three units.

The hereinbefore described embodiments have been found to have very low noise level and to have the ability to sense very small changes in acceleration. Practical embodiments of my accelerometers have been found to have a resolution to 0.002% of full scale, linearity to 0.02% of full scale, and D.-C. reproducibility to 0.02% of full scale. They also have zero output at zero input, a minimum full range of plus or minus 0.05 g. and a maximum full range of plus or minus 50 g. An output up to ±30 volts or ±2 milliamperes can be obtained. This output has been obtained with a displacement of less than .001 of an inch of the conducting element. In addition, the output is not dependent on input voltage regulation. The output voltage has been found to be proportional to acceleration for frequencies from zero to 25 cycles per second and higher. Useful outputs have been obtained up to several times this frequency with reduced amplitude accuracy and full scale range.

Figure 12:
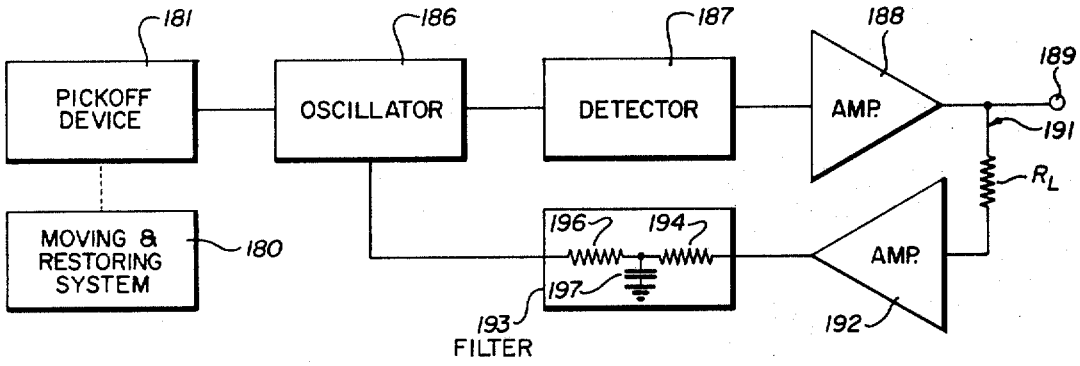
FIGURE 12 is a block diagram of another embodiment of the present invention showing a transducer of the resonant type.

Another embodiment of the invention is shown in the schematic diagram in FIGURE 12, and consists of a moving and restoring system 180 and a pickoff device 181 which are similar to those hereinbefore described. The pickoff device 181 is connected to an oscillator 186 and the output of the oscillator is fed into a detector 187. The output of the detector feeds into the output amplifier 188. The oscillator, the detector and the output amplifier are similar to that hereinbefore described and for that reason will not be described in detail. The output is supplied to the user at terminal 189.

A feedback path 181 is provided. The feedback includes an amplifier 192 of conventional design which feeds into a filter 193. The filter 193 consists of serially connected resistances 194 and 196 which have their common connection connected to ground through a capacitor 197. The output of the filter is connected to the oscillator 186 and is connected in the oscillator circuitry which is shown in FIGURE 2 at the feedback function 198.

The filter 193 filters out the high frequencies and, therefore, prevents the high frequencies from being fed back. In effect, it nullifies the effect of the high frequencies on the oscillator 186. By high frequencies, I mean those frequencies in excess of one cycle per second, for example. The filter 193, therefore, permits only the average offset in the output 189 to be fed back to the oscillator. The current which flows in the feedback path 191 actually adds to the current at the feedback junction, that is, it is linearly summed with the constant current from the bias source of the resistance 58 and, therefore, adds or subtracts from the average current operating level of the transistor and moves the characteristic of the detector back and forth, as for example, between the curves 113 and 114 as shown in FIGURE 8. Thus, in effect, the feedback path acts as an automatic centering means by providing negative feedback, and serves to determine the operating current level of the oscillator and thereby the characteristic of the detector as hereinbefore described in conjunction with FIGURES 7 and 8.

For example, let it be assumed that the pickoff device 181, which can be called an error detector, is positioned near a surface or member which it is desired to observe. This general positioning of the pickoff with respect to the surface or member in effect is like a poorly positioned pickoff with respect to its inherent electrical zero. The feedback path 191 will make a correction in the electrical zero by shifting the characteristic of the detector 187 so that the average D.-C. output from the amplifier 188 returns to zero and thereby moves the sensitive transducer position to the center of the operating range. Thus, in this manner, it is possible to close the loop on the detector and at the same time maintain its average operating position in the correct position while observing the vibrations or other rapid changes in the position of the element being observed.

This can be done with an arbitrarily slow feedback path so that position changes of very slow character can be observed. If desired, an integrator can be included in the feedback path to automatically null the output of the transducer until it is desired to observe a change in position. The integrator input can then be disconnected and the feedback path can then maintain the electrical zero at the point determined before the disconnection occurs. For example, in a practical embodiment, the pressure diaphragm in a rocket can be observed before the rocket is fired. Any output from the pickoff can be nulled out during the time the rocket is fired and thereafter the automatic zeroing circuit disabled so that any subsequent variations can be detected and changed into electrical signals regardless of their frequency components.

This combination of an automatically nulling pickoff with a mechanically resonant system permits the manufacture of resonant transducers which can detect extremely low amplitude vibrations at some specific frequency to which the mechanical system is tuned. Thus, it is possible to detect vibrations expected in a gyro system due to drift or other sources.

By way of example, one practical resonant accelerometer embodying the above invention had a clearly defined proportional response down to applied displacements of $3\times10^{-10}$ radians double amplitude at its natural frequency of 850 cycles per second. The noise level of the transducer was measured at $40\times10^{-12}$ radians double amplitude applied vibration at the natural frequency. The mechanical Q was found to be approximately 800.

Figure 13:
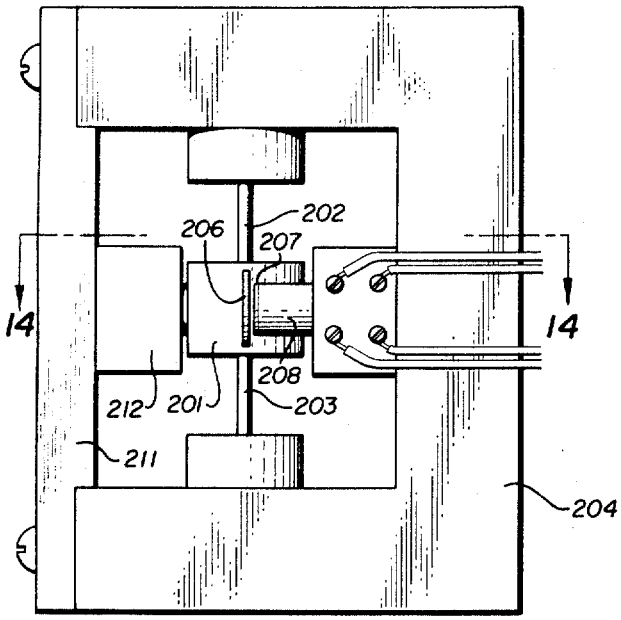
FIGURE 13 is an enlarged side elevational view of the moving and restoring system and pickoff device suitable for use with a resonant transducer.
Figure 14:
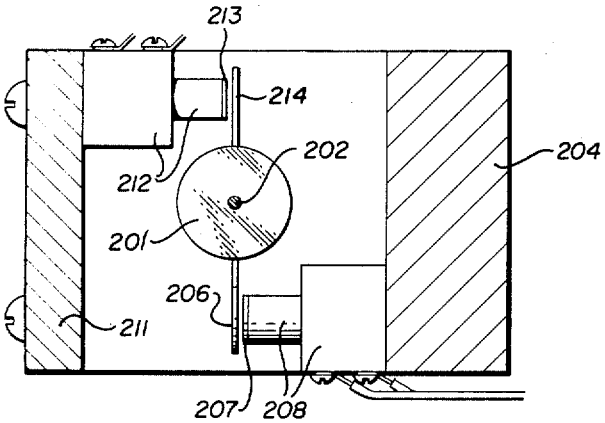
FIGURE 14 is a cross-sectional view taken along the line 14—14 of FIGURE 13.

A moving and restoring system 180 and a pickoff device 181 suitable for use in the resonant transducer shown in the schematic diagram in FIGURE 12 is shown in detail in FIGURES 13 and 14. As shown therein, it consists of a mass in the form of a cylindrical rotor 201 which is supported by a pair of torsion rods 202 and 203 in axial alignment with the axis of the rotor 201. The ends of the torsion rods remote from the rotor 201 are supported very firmly by suitable, relatively sturdy support means such as the massive U shaped member 204 as shown in the drawing. Such a massive support means is provided so that vibrations in the mass 201 do not cause losses in he supporting means which would result in a reduction of the mechanical Q of the system.

The torsion rods 202 and 203 provide the restoring force. The torsion rods have a constant stiffness which is determined by their characteristics. Therefore, it is apparent that this type of restoration is quite different from that of the transducers hereinbefore described in which the restoring torque is determined by the servo itself through the position detector.

The moving system also includes a flat conducting plane 206 which is fixed on the rotor 201 and extends radially therefrom.

The pickoff device 181 is in the form hereinbefore described and consists of a pancake type transformer 207 which is carried by a mounting block 208 in such a manner that the transformer 207 lies in a plane substantially parallel to the conducting plane 206. When this transformer 207 is connected into the circuitry hereinbefore described in conjunction with FIGURE 12, the transformer 207 is provided with automatic zeroing and observes the conducting plane 206. With such automatic zeroing, the average output from the circuit is zero. However, maximum sensitivity to vibrations or movement of the conducting plane 206 is provided.

It will be noted that a flat plate 211 has been mounted across the open part of the U shaped member 204 and that affixed thereto there is a mounting block 212 which carries a pancake type transformer 213. A flat conducting plane 214 is mounted on the rotor 201 and also extends radially therefrom in a plane which is parallel to the plane of the conducting plane 206. This additional pickoff device in the form of transformer 213 has been provided to eliminate sensitivity to linear acceleration. Without such additional pickoff device, the mass would be deflected under linear acceleration and cause a response in the pickoff device. However, by utilizing pickoffs, as shown in the drawings, on opposite sides of the inertial element, that is, the mass or rotor 201, rotation of the moving system will bring the two conducting planes closer to both the pickoff devices simultaneously, whereas a linear acceleration would deflect the mass without rotation and would bring one conducting plane closer to the pickoff and move the other conducting plane farther away from the pickoff. By properly connecting the pickoff devices, e.g., in serial aiding relationship, the effect of the linear acceleration can be nulled out.

The moment of inertia of the rotor 201 connected together with the spring constant of the torsion rods determines the natural frequencies so that the only real control necessary after choosing the size of the rotor is to adjust the size of the torsion rods to tune the system into resonance at the desired frequency. The restoring force on the rotor is almost entirely due to the torsion rods and desirably so because the motions of all the other support members, since they are relatively massive, are negligible, and therefore, their dissipation or effect on the Q of the moving system is also negligible.

With such apparatus, it was found that mechanical Q's of 1000 can be easily achieved and that Q's of over 10,000 are possible.

This system is almost a completely undamped system and is used so that a very high sensitivity can be obtained at the resonant frequency. In the angular accelerometer hereinbefore described, as much as possible of the resonant behavior is eliminated because a flat response is desired from D.-C. up to the maximum useable frequency, as for example, from D.-C. up to 100 cycles per second.

This particular arrangement which is shown in FIGURES 13 and 14 is particularly advantageous in that it makes possible a very compact and sub-miniature pickoff which is adaptable for remote attachment of the associated electronics so that only the sensing element need be mounted within the device which is being observed, as for example, a gyro. The output of the resonant unit, since the resonant frequency is known, can be examined with a signal analyzer to eliminate noise frequencies which may interfere with the measurements desired. In a more elaborate system, it is possible to use the principles of cross-correlation to examine the noise or output of the system and compare it with the reference frequency so that small components of the resonant reference frequency can be sensed and used as an indication of minute vibration.

It is apparent from the foregoing that I have provided a transducer which can be utilized for detecting static and dynamic positions of elements and particularly a transducer of this type which is adaptable to be used in linear and angular-motion accelerometers of the resonant and non-resonant types. When utilized with transistorized electronics, the accelerometers are very small and compact, and they provide an output voltage which is sufficient for many purposes without further amplification. Accelerometers so constructed are particularly sensitive so that very small changes in acceleration can be noticed.

It is also apparent from the foregoing that my transducer can be utilized in many different types of industrial regulating and control applications. For example, it can be used as a general purpose position detector in open or closed loops where generation of an error signal is required for follow-up or regulation.

I claim:

1. In a transducer for measuring acceleration, a conducting planar element, means for mounting said planar element for angular movement, a magnet, a coil disposed in the magnetic field of said magnet and secured to said planar element for angular movement with said conducting planar element, an inductive pickoff element consisting of a pair of coaxial windings, the windings lying in a plane substantially parallel to the plane of the conducting element and on one side of the conducting element, means for applying excitation to the pickoff element to establish a magnetic field, the conducting element being positioned relatively close to the pickoff element so that the coupling between the windings is disturbed and losses are reflected into the windings by the conducting element, detector means connected to said means for supplying excitation to the pickoff element to give an indication of the position of the conducting element relative to the pickoff, [and] feedback means coupled to said detector means for applying a current to said coil proportional to the displacement of the conducting planar element, said means for applying excitation to the inductive pickoff element consisting of an oscillator which normally oscillates continuously, the oscillator including a tank circuit and a feedback circuit, one of the windings of the inductive pickoff element being connected into the tank circuit of the oscillator to form a part of the tank circuit and the other of the windings being connected into the feedback circuit of the oscillator, the output of the oscillator being modulated by variations in spacing between the conducting element and the inductive pickoff element, *and additional feedback means coupling the detector means to the oscillator to change the gain of the oscillator to thereby control the loop gain and the frequency response of the transducer.*

2. In a transducer for measuring linear acceleration, a housing having ends, a mass, means supporting said mass within said housing for linear movement toward and away from said ends, an inductive pickoff element having two windings mounted on one of said ends of the housing, a conducting planar element mounted on the end of said mass adjacent said pickoff element and on one side of the pickoff element, a magnet mounted on the other end of said housing, a coil mounted on the other end of said mass adjacent and in the field of said magnet, oscillator means for applying excitation to the pickoff element to establish a magnetic field, the conducting planar element being normally positioned relatively close to the pickoff element so that losses are reflected into the oscillator means by the conducting planar element to change the loop gain of the oscillator means, detector means connected to said oscillator means to give an indication of the position of the conducting planar element relative to the pickoff elemente, [and] feedback means connected to said detector means for applying current to said coil proportional to the displacement of the conducting planar element, said oscillator means for applying excitation to the pickoff element consisting of an oscillator including a tank circuit and a feedback circuit, one of the windings of the pickoff element being connected to the tank circuit of the oscillator to form a part of the tank circuit and the other of the windings being connected into the feedback circuit of the oscillator, the output of the oscillator being amplitude modulated by variations in spacing between the conducting planar element and the pickoff element which causes a change in the Q of the tank circuit of the oscillator, *and additional feedback means in the form of a resistive-capacitive network coupling the detector means to the oscillator to change the gain of the oscillator to thereby control the loop gain and frequency response of the transducer.*

3. In a transducer, a rigid framework, a torsion member mounted in said rigid framework, a mass supported by said torsion member, a conducting planar element carried by the mass, a pickoff transformer mounting on the framework and disposed adjacent the conducting planar element, the pickoff transformer consisting of a pair of windings disposed on one side of the conducting planar element, oscillator means for applying excitation to the pickoff transformer to establish a magnetic field, the conducting planar element and the pickoff transformer being positioned so that the conducting element disturbs the coupling between the windings and introduces losses into the oscillator means to change the loop gain of the oscillator, and detector means connected to said oscillator means to give an indication of the position of the conducting element relative to the transformer, said oscillator means for applying excitation to the pickoff transformer consisting of an oscillator including a tank circuit and a feedback circuit, one of the windings of the pickoff transformer being connected in the tank circuit of the oscillator to form a part of the tank circuit and the other of the windings being connected into the feedback circuit of the oscillator, the Q of the tank circuit being modulated by variations in spacing between the conducting planar element and the pickoff transformer *and feedback means coupling the detection means to the oscillator to change the gain of the oscillator to thereby control the loop gain and frequency response of the transducer.*

4. A transducer as in claim 3 together with an additional conducting planar element fixed to the mass on the opposite side of the mass and extending in the same plane as the first named conducting planar element, an additional pickoff transformer mounted on said framework and disposed adjacent said additional conducting planar element on the side of said additional conducting planar element opposite the side on which said first named pickoff transformer is mounted with respect to the first named conducting element, the first named and additional pickoff transformers being arranged so that upon rotational movement of the mass in one direction, both of said conducting planar elements will be moved closer to their respective pickoff transformers and upon rotation of said mass in an opposite direction both of said conducting planar elements will be moved away from their respective pickoff transformers.

5. In a transducer, a conducting planar element, a pickoff transformer consisting of a pair of windings disposed on one side of the conducting planar element, an oscillator [circuit] including a tank circuit and a feedback circuit, one of the windings of the transformer being connected into the tank circuit of the oscillator to form a part of the tank circuit and the other being connected into the feedback circuit of the oscillator, the coupling between the windings and the Q of the tank circuit being changed and the output of the oscillator being modulated by variations in spacing between the conducting element and the pickoff transformer, [and] detector means connected to the oscillator to give a continuous indication of the position of the conducting element relative to the pickoff transformer, *and feedback means coupling the detector means to the oscillator to change the gain of the oscillator to thereby control the loop gain and frequency response of the transducer.*

6. A transducer as in claim 5 wherein the conducting element is movable with respect to said pickoff transformer together with restoring means for placing a restoring force on the conducting element proportional to the displacement of the conducting element.

7. A transducer as in claim 5 wherein said oscillator circuit includes a transistor having base, collector and emitter elements, and wherein said winding connected in the tank circuit is connected between the base and collector elements of said transistor and said winding connected to the feedback circuit of the oscillator is connected between the base and the emitter elements of the transistor being arranged in a grounded base configuration and operating with an alpha gain.

8. A transducer as in claim 5 wherein the winding connected to the feedback circuit of the oscillator has an impedance of intermediate value so that the output of the oscillator remains unchanged through relatively wide temperature ranges.

9. In a transducer, a conducting planar element, a pickoff transformer consisting of a pair of windings, an oscillator circuit including a tank circuit and a feedback circuit, one of the windings of the transformer being connected into the tank circuit of the oscillator to form a part of the tank circuit and the other being connected into the feedback circuit of the oscillator, the output of the oscillator being modulated by variations in spacing between the conducting element and the pickoff transformer, detector means connected to the oscillator to give an indication of the position of the conducting element relative to the pickoff transformer, the conducting element being movable with respect to the pickup transformer, and restoring means for placing a restoring force on the conducting element proportional to the displacement of the conducting element, said restoring means consisting of a compliant elastic member connected to the conducting element, and means for feeding back a signal from said detector means to the feedback circuit of the oscillator to thereby affect the operating characteristics of the oscillator, the signal having a value so that the average D.-C. output from the detector means is zero.

10. In a transducer, a conducting planar element, a pickoff transformer consisting of a pair of windings positioned relatively close to the conducting element, an oscillator circuit having a tank circuit and a feedback circuit, one of the windings of the transformer being connected into the tank circuit of the oscillator to form a part of the tank circuit and the other being connected to the feedback circuit of the oscillator, the output of the oscillator being modulated by variations in spacing between the pickoff transformer and the conducting element, detector means connected to the oscillator for giving an indication of the position of the conducting element relative to the pickoff transformer, amplifier means connected to said detector means, and feedback means connected between the output of the amplifier and the feedback circuit of the oscillator to control the operating level of the oscillator and to thereby maintain the average D.-C. output from the amplifier at zero.

11. In a transducer, a conducting planar element, an inductive pickoff element positioned relatively close to the conducting planar element, an oscillator circuit having a tank circuit and a feedback circuit, the inductive pickoff element being connected to the tank circuit of the oscillator to form a part of the tank circuit, the Q of the tank circuit being changed and the output of the oscillator being modulated by variations in spacing between the conducting planar element and the inductive pickoff element, detector means connected to the oscillator and giving an indication of the position of the conducting planar element relative to the inductive pickoff element, and feedback means coupled between the output of the detector means and the feedback circuit of the oscillator to control the operating level of the oscillator and to thereby maintain the average D.-C. output from the detector means at zero.

12. In a transducer for measuring acceleration, a conducting element, means for mounting said conducting element for movement, a magnet, a coil disposed in the magnetic field of said magnet and secured to said conducting element for movement with said conducting element, an inductive pickoff element having a pair of windings disposed on one side of the conducting element, an oscillator having a tank circuit and feedback means, one of the windings of the inductive pickoff element being connected into the feedback means of the oscillator, the oscillator serving to supply self-generating excitation to the inductive pickoff element to establish a magnetic field, the conducting element being positioned relatively close to the inductive pickoff element so that it varies the load impedance on the oscillator to thereby modify the loop gain of the oscillator, the loading of the oscillator by the movement of the conducting element serving to inhibit oscillation of the oscillator, detecting means connected to said oscillator to give an indication of the position of the conducting element relative to the inductive pickoff element, [and] feedback means coupled to said detector means for applying a current to said coil proportional to the displacement of the conducting element, *and negative feedback means in the form of a resistive-capacitive network coupling the detector means to the oscillator to control the loop gain and the frequency response of the transducer.*

13. In a transducer for measuring acceleration, a conducting element, means for mounting said conducting element for movement, a magnet, a coil disposed in a magnetic field of said magnet and secured to said conducting element for movement with said conducting element, an inductive pickoff element, an oscillator having a tank circuit and feedback means, the inductive pickoff element being connected to and forming a part of the tank circuit of the oscillator, the oscillator serving to supply self-generating excitation to the inductive pickoff element to establish a magnetic field, the conducting element being positioned relatively close to the inductive pickoff element so that it varies the load impedance on the oscillator to thereby modify the loop gain of the oscillator, the loading of the oscillator by the movement of the conducting element serving to inhibit oscillation of the oscillator, detector means connected to said oscillator to give an indication of the position of the conducting element relative to the inductive pickoff element, and feedback means coupled to said detector means for applying a current to said coil proportional to the displacement of the conducting element, said oscillator including a transistor having a base, emitter and collector elements, and an emitter base driving circuit, the tank circuit forming a part of the emitter base driving circuit of the transistor, the impedance presented to the emitter base driving circuit of the transistor by the inductive pickoff element and the tank circuit being chosen so that the voltage gain and the current gain of the transistor are utilized to achieve a constant gain for the transistor independent of temperature.

14. In a transducer, a conducting element, a pickoff transformer consisting of a pair of windings disposed in relatively close proximity to and on one side of the conducting element, an oscillator having a tank circuit and a feedback circuit, one of the windings of the transformer being connected into the tank circuit of the oscillator to form a part of the tank circuit and the other of the windings being connected to the feedback circuit of the oscillator, the conducting element and the pickoff transformer being arranged so that upon a change in spacing between the conducting element and the pickoff transformer, two aiding effects occur to modulate the output of the oscillator in accordance with the variations in spacing between the pickoff transformer and the conducting element, one of the effects being the change in coupling between the two windings, the other effect being to change the Q of the tank circuit, [and] detector means connected to the oscillator for giving an indication of the spacing between the conducting element and the pickoff transformer, *and negative feedback means in the form of a resistive-capactive network connected between the detector means and the oscillator.*

15. A transducer as in claim 14 wherein said pair of windings are coaxial and of the pancake type and lie in a plane substantially parallel to the plane of the conducting element.

16. A transducer as in claim 14 wherein the pair of windings and the conducting element are arranged so that as the spacing between the conducting element and the pickoff transformer is decreased, the coupling between the two windings is decreased and the Q of the tank circuit is lowered.

17. In a transducer, a conducting planar element, a pickoff transformer consisting of a pair of coaxial windings, the windings lying in a plane relatively close to and substantially parallel to the plane of the conducting element, an oscillator [circuit] having a tank circuit and a feedback circuit, one of the windings of the transformer being connected into the tank circuit of the oscillator to form a part of the tank circuit and the other being connected into the feedback circuit of the oscillator, the output of the oscillator being modulated by variations in spacing between the pickoff transformer and the conducting element, detector means connected to the oscillator for giving an indication of the position of the conducting element relative to the pickoff transformer, and amplifier means connected to said detector means, said amplifier means including first, second and third transistors having base, collector and emitter elements, means for connecting the output of the detector means to the base of the first transistor, means connecting the emitter of the first transistor to the base of the second transistor, means for connecting the collector of the first transistor to the base of the third transistor, a negative D.-C. supply, means for connecting the negative D.-C. supply to the emitter of the second transistor, a positive D.-C. supply, means for connecting the positive D.-C. supply to the collector of the third transistor, impedance means connecting the collector of the second transistor to the emitter of the third transistor, impedance means connecting the positive D.-C. supply to the base of the third transistor, [and] diode means connected between the collector of the second transistor and the base of the third transistor, *a load resistor connected between the emitter of the third transistor and ground and negative feedback means in the form of a resistive-capacitive network coupled to the load resistor and connected to the oscillator.*

18. A transducer as in claim 17 together with *a constant* [a load resistor connected between the emitter of the third transistor and ground, and feedback means coupled to said load resistor] *voltage power supply means connected to said oscillator.*

19. A transducer as in claim [18] *17* wherein said feedback means is connected into the feedback circuit of the oscillator to thereby control the operating level of the oscillator and to thereby maintain the average D.-C. output from the amplifier at zero.

20. A transducer as in claim 18 together with restoring means connected to said conducting element and [wherein] said additional feedback means [is] connected to said restoring means and coupled to the load resistor, the force applied to the conducting element by the restoring means being equal to the force tending to move the conducting element.

References Cited

The following references, cited by the Examiner, are of record in the patented file of this patent or the original patent.

UNITED STATES PATENTS

| | | |
|---|---|---|
| 2,154,260 | 4/1939 | Bradenburger. |
| 2,580,670 | 11/1952 | Gilbert. |
| 2,614,163 | 10/1952 | Roper. |
| 2,629,004 | 2/1953 | Greenough. |
| 2,767,973 | 10/1956 | Ter Veen et al. |

| | | | |
|---|---|---|---|
| 2,827,604 | 3/1958 | Cloud. | |
| 2,899,190 | 8/1959 | Driver. | |
| 2,942,476 | 6/1960 | Turner. | |
| 2,656,519 | 10/1953 | Sheppard | 73—517 |
| 2,697,594 | 12/1954 | Stanton | 73—517 |
| 2,846,207 | 8/1958 | Marggrad | 73—517 |
| 2,912,657 | 11/1959 | Schaevitz | 73—517 |
| 3,023,626 | 3/1962 | Bonnell | 73—517 |

FOREIGN PATENTS

| | | |
|---|---|---|
| 715,750 | 9/1954 | Great Britain. |

RICHARD C. QUEISSER, Primary Examiner

H. GOLDSTEIN, Assistant Examiner